United States Patent
Sheppard et al.

(10) Patent No.: US 9,986,272 B1
(45) Date of Patent: May 29, 2018

(54) METHODS AND APPARATUS TO DETERMINE A DURATION OF MEDIA PRESENTATION BASED ON TUNING SESSION DURATION

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tucson, AZ (US); Alejandro Terrazas, Santa Cruz, CA (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days. days.

(21) Appl. No.: 15/011,455

(22) Filed: Jan. 29, 2016

Related U.S. Application Data

(60) Provisional application No. 62/239,126, filed on Oct. 8, 2015.

(51) Int. Cl.
*H04N 21/25* (2011.01)
*H04N 21/466* (2011.01)

(52) U.S. Cl.
CPC ....... *H04N 21/252* (2013.01); *H04N 21/4667* (2013.01)

(58) Field of Classification Search
CPC .......................... H04N 21/252; H04N 21/4667
USPC ............................ 725/10, 12, 14, 34, 38, 46
See application file for complete search history.

(56) References Cited

U.S. PATENT DOCUMENTS

| | | | |
|---|---|---|---|
| 6,286,140 B1 | 9/2001 | Ivanyi | |
| 6,363,380 B1 | 3/2002 | Dimitrova | |
| 7,954,120 B2 | 5/2011 | Roberts et al. | |
| 8,701,134 B2 | 4/2014 | Whinmill et al. | |
| 8,839,278 B2 | 9/2014 | Wang et al. | |
| 2002/0129368 A1* | 9/2002 | Schlack | G06Q 30/02 725/46 |
| 2003/0101449 A1 | 5/2003 | Bentolila et al. | |
| 2007/0061831 A1 | 3/2007 | Savoor et al. | |
| 2008/0300965 A1 | 12/2008 | Doe | |
| 2012/0254911 A1 | 10/2012 | Doe | |
| 2014/0037942 A1 | 2/2014 | Park et al. | |

* cited by examiner

*Primary Examiner* — Jivka Rabovianski
(74) *Attorney, Agent, or Firm* — Hanley, Flight & Zimmerman, LLC

(57) ABSTRACT

Methods, apparatus, systems and articles of manufacture are disclosed to monitor media presentation to determine a period of media presentation based on tuning session period are disclosed. Example methods disclosed herein include determining a first tuning session based on a period of time between channel changes of a first media presentation device, determining first presentation session data within the determined first tuning session, determining a model relating the first tuning session with the first presentation session data, determine a second tuning session for tuning data from a second media presentation device, selecting the model for the second tuning session, based on a match of a first duration of the second tuning session and a second duration associated with the model, and estimating second presentation session data for the second tuning session based on the model.

21 Claims, 11 Drawing Sheets

| Household ID | Tuner Key | Start Time | End Time | Station Key | Genre | Presentation Weight Date Key | Valid Data Flag | Source |
|---|---|---|---|---|---|---|---|---|
| 50006 | 186242092 | 2014-12-01 00:00:00 | 2014-12-01 00:25:00 | 294984 | N/A | 17427 | 1 | 0 |
| 50006 | 186242092 | 2014-12-01 00:34:00 | 2014-12-01 02:55:00 | 287552 | Non-Media | 17427 | 1 | 0 |
| 50006 | 186242092 | 2014-12-01 04:52:00 | 2014-12-01 05:46:00 | 287552 | Non-Media | 17427 | 1 | 0 |
| 50006 | 186242092 | 2014-12-01 20:50:00 | 2014-12-01 21:35:00 | 287552 | Non-Media | 17427 | 1 | 0 |
| 50006 | 186242092 | 2014-12-01 22:41:00 | 2014-12-01 23:24:00 | 294984 | N/A | 17427 | 1 | 0 |
| 50006 | 186242092 | 2014-12-01 23:29:00 | 2014-12-01 23:59:00 | 294984 | N/A | 17427 | 1 | 0 |
| 50006 | 186242092 | 2014-12-02 15:20:00 | 2014-12-02 15:33:00 | 349355 | Gen. Ent. | 17428 | 1 | 0 |
| 50006 | 186242092 | 2014-12-03 14:49:00 | 2014-12-03 14:53:00 | 348488 | Gen. Ent. | 17429 | 1 | 0 |
| 50006 | 186242092 | 2014-12-03 22:21:00 | 2014-12-03 22:21:00 | 287552 | Non-Media | 17429 | 1 | 0 |
| 50006 | 186242092 | 2014-12-03 22:27:00 | 2014-12-03 22:30:00 | 288298 | N/A | 17429 | 1 | 0 |
| 50006 | 186242092 | 2014-12-03 23:37:00 | 2014-12-03 23:48:00 | 287552 | Non-Media | 17429 | 1 | 0 |
| 50006 | 186242092 | 2014-12-04 00:00:00 | 2014-12-04 00:23:00 | 287552 | Non-Media | 17430 | 1 | 0 |
| 50006 | 186242092 | 2014-12-04 23:00:00 | 2014-12-04 23:47:00 | 287552 | Non-Media | 17430 | 1 | 0 |
| 50006 | 186242092 | 2014-12-04 23:55:00 | 2014-12-05 01:40:00 | 287552 | Non-Media | 17431 | 1 | 0 |

| Household ID | Tuner Key | Start Time | End Time | Station Key | Genre | Presentation Weight Date Key | Valid Data Flag | Source |
|---|---|---|---|---|---|---|---|---|
| 50006 | 186242092 | 2014-12-01 00:00:00 | 2014-12-01 00:25:00 | 294984 | N/A | 17427 | 1 | 0 |
| 50006 | 186242092 | 2014-12-01 00:34:00 | 2014-12-01 02:56:00 | 287552 | Non-Media | 17427 | 1 | 0 |
| 50006 | 186242092 | 2014-12-01 04:52:00 | 2014-12-01 05:46:00 | 287552 | Non-Media | 17427 | 1 | 0 |
| 50006 | 186242092 | 2014-12-01 20:50:00 | 2014-12-01 21:35:00 | 287552 | Non-Media | 17427 | 1 | 0 |
| 50006 | 186242092 | 2014-12-01 22:41:00 | 2014-12-01 23:24:00 | 294984 | N/A | 17427 | 1 | 0 |

```
00:25:00 | Turned the TV off after watching previous station
00:34:00 | Turned TV back on and within the same
         | minute changed channel
02:56:00 | Turned TV off
04:52:00 | Turned TV on (same channel)
05:46:00 | Turned TV off
20:50:00 | Turned TV on (same channel)
21:35:00 | Turned TV off
22:41:00 | Turned TV on and changed channel
```

FIG. 7C

```
Tuning Session:
   00:34:00 to 22:41:00 (1,327 minutes)

Presentation Sessions:
   00:34:00 -- 2:56:00 (142 minutes)
   04:52:00 -- 5:46:00 (54 minutes)
   20:50:00 -- 21:35:00 (45 minutes)
```

| Tuning Session Length (minutes) | 0 | 1 | 2 | 3 | 4 | 5 | 6 | 7 | 8 | 9 | 10 |
|---|---|---|---|---|---|---|---|---|---|---|---|
| 10 | 112 | 242 | 338 | 370 | 390 | 490 | 491 | 781 | 901 | 903 | 945 |

Frequency Distribution of Presentation Time (minutes)

| Tuning Session Length (minutes) | 0 | 1 | 2 | 3 | 4 | 5 | 6 | 7 | 8 | 9 | 10 |
|---|---|---|---|---|---|---|---|---|---|---|---|
| 10 | 2% | 4% | 6% | 6% | 7% | 8% | 8% | 13% | 15% | 15% | 16% |

Conditional Distribution of Presentation Time (minutes)

| Tuning Session Length (minutes) | 0 | 1 | 2 | 3 | 4 | 5 | 6 | 7 | 8 | 9 | 10 |
|---|---|---|---|---|---|---|---|---|---|---|---|
| 10 | 2% | 6% | 12% | 18% | 24% | 33% | 41% | 54% | 69% | 84% | 100% |

Cumulative Distribution of Presentation Time (minutes)

| Tuning Session Length (minutes) | Frequency Distribution of Media Presented at Set Times (minutes) | | | | | | | | | | |
|---|---|---|---|---|---|---|---|---|---|---|---|
| | at 0 | at 1 | at 2 | at 3 | at 4 | at 5 | at 6 | at 7 | at 8 | at 9 | at 10 |
| 10 | 5851 | 5852 | 5619 | 5290 | 4500 | 4411 | 4521 | 4530 | 3749 | 2848 | 2945 |

FIG. 8D

| Tuning Session Length (minutes) | Conditional Distribution of Media Presented at Set Times (minutes) | | | | | | | | | | |
|---|---|---|---|---|---|---|---|---|---|---|---|
| | at 0 | at 1 | at 2 | at 3 | at 4 | at 5 | at 6 | at 7 | at 8 | at 9 | at 10 |
| 10 | 100% | 98% | 94% | 88% | 75% | 74% | 76% | 76% | 63% | 48% | 49% |

METHODS AND APPARATUS TO DETERMINE A DURATION OF MEDIA PRESENTATION BASED ON TUNING SESSION DURATION

This patent claims the benefit of U.S. Provisional Patent Application Ser. No. 62/239,126, entitled "METHODS AND APPARATUS TO DETERMINE A DURATION OF MEDIA PRESENTATION BASED ON TUNING SESSION DURATION" and filed on Oct. 8, 2015, which is hereby incorporated herein by reference in its entirety.

FIELD OF THE DISCLOSURE

This disclosure relates generally to media audience measurement, and, more particularly, to methods and apparatus to determine a duration of media presentation based on tuning session duration.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a plurality of media consumers (often called panelists) to cooperate in an audience measurement study (often called a panel) for a predefined length of time. The media consumption habits and demographic data associated with these enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

The process of enlisting and retaining participants for purposes of audience measurement is often a difficult and costly aspect of the audience measurement process. For example, participants are typically carefully selected and screened for particular characteristics so that the population of participants is representative of the overall presentation population. Additionally, the participants are required to perform specific tasks that enable the collection of the data, such as, for example, periodically self-identifying while consuming media programming.

BRIEF DESCRIPTION OF THE DRAWINGS

FIG. 6 is an example table of measurement data collected by the example local people meter of FIG. 1.

FIGS. 7A-7C are tables of example tuning session data and presentation session data collected by the example local people meter of FIG. 1 in accordance with the teachings of this disclosure.

FIGS. 8A-8E are tables of statistical models generated by the data adjuster of FIGS. 1 and/or 2 based on data from the local people meters of FIG. 1 in accordance with the teachings of this disclosure.

DETAILED DESCRIPTION

Figure 1:
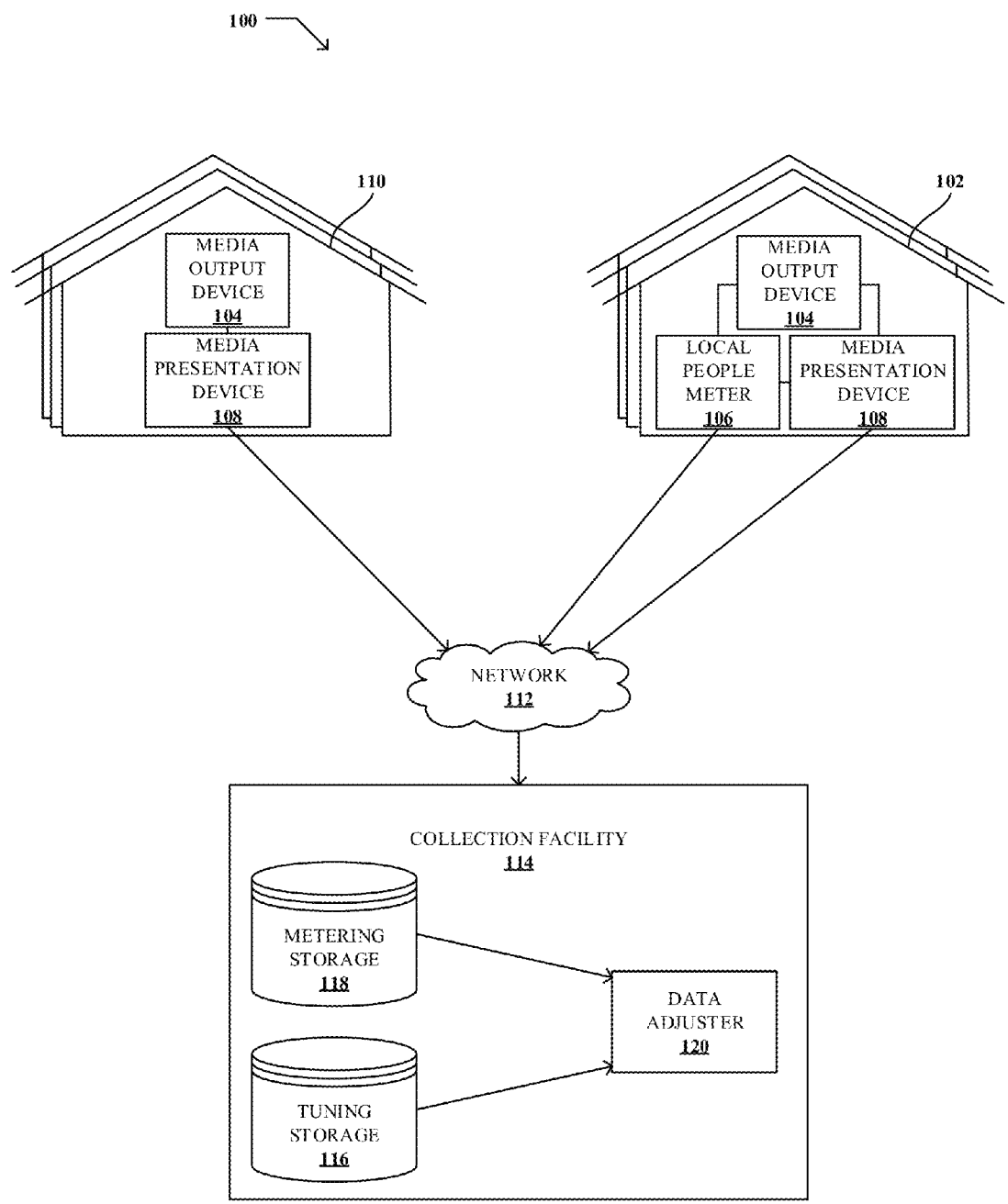
FIG. 1 is a block diagram of an example environment in which media presentation information is collected from media presentation locations and is analyzed by an example collection facility to determine durations of media presentation in accordance with the teachings of this disclosure.

Audience measurement entities seek to understand the composition and size of audiences of media, such as television programming. Such information allows audience measurement entity researchers to, for example, report advertising delivery and/or targeting statistics to advertisers that target their media (e.g., advertisements) to audiences. Additionally, such information helps to establish advertising prices commensurate with audience exposure and demographic makeup (referred to herein collectively as "audience configuration"). One way to gather media presentation information is to gather media presentation information from media output devices (e.g., gathering television presentation data from a set-top box (STB) connected to a television). As used herein media presentation includes media output regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned on the media presentation device at a particular time) to an audience measurement entity (e.g., The Nielsen Company (US), LLC.) to analyze media presentation activity. The tuning data is based on data received from the media presentation device while the media presentation device is on (e.g., powered on, switched on, and/or tuned to a media channel, streaming, etc.). However, tuning data may include extraneous data that may not accurately reflect media presentation when, for example, the media presentation device is configured to output media via a media output device (e.g., a television), but the media output device is turned off, not receiving the media from the media presentation device, etc. For example, tuning data may include data related to a STB that outputs television media via a television while the television is off, disconnected, turned to input other than the STB, etc. In another example, the tuning data collected by the media presentation device may not accurately reflect media actually exposed to an audience when the media presentation device is attempting to present the media but no audience members are present (e.g., a STB and/or a television is on and/or presenting media while no person is present to consume the media). To develop a more accurate estimation of the actual media presentation by the media presentation device, methods and apparatus disclosed herein analyze measurement data (e.g., tuning data) collected from media presentation devices (that may inaccurately reflect the media actually presented to an audience).

To determine aspects of media presentation data (e.g., which household member is currently consuming a particular media and the demographics of that household member), market researchers may perform audience measurement by enlisting a subset media consumers as panelists. Panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the panelist members via audience measurement system(s), such as a metering device(s) and/or a local people meter (LPM). Audience measurement typically include determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via network, such as the Internet, to a datastore managed by the audience measurement entity. Typically, such metering data is combined with additional metering data collected from a plurality of LPMs monitoring a plurality of panelist households. Example disclosed herein process the collected and/or aggregated metering data to determine model(s) based on a period of time between channel changes (referred to herein as tuning sessions). The metering data and/or the model(s) may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.). As used herein a channel may be a tuned frequency, selected stream, an address for media (e.g., a network address), and/or any other identifier for a source and/or carrier of media.

In an effort to transform collected tuning data from media presentation devices (e.g., STBs) into media presentation data (e.g., to account for data including when the media output device is off or not used and/or when an audience member is not present), examples disclosed herein estimate presentation data from collected tuning data based on models determined from the metering data received from LPMs. Examples disclosed herein include determining a first tuning session based on a period of time between channel changes of a first media presentation device. Such examples further include determining first presentation session data within the determined first tuning session. Such examples further include determining a model relating the first tuning session with the first presentation session data. Such examples further include determining a second tuning session for tuning data from a second media presentation device. Such examples further include selecting the model for the second tuning session, based on a match of a first duration of the second tuning session and a second duration associated with the model. Such examples further include estimating second presentation session data for the second tuning session based on the model.

FIG. 1 is a block diagram of an example environment 100 in which tuning data is collected from an example media presentation location 110 and is analyzed by an example collection facility 114 to estimate presentation session for tuning sessions within the tuning data. The example environment 100 includes a first example media presentation location 102, example media output devices 104, an example LPM 106, example media presentation devices 108, the second media presentation location 110, an example network 112, the example collection facility 114, an example data adjuster 120, an example tuning storage 116, and an example metering storage 118. According to the illustrated example, the collection facility 114 collects audience measurement (e.g., metering) data from the example LPM 106. The example data adjuster 120 creates model(s) based on the collected metering data. The example data adjuster 120 uses the models to estimate presentation sessions based on tuning data from the example media presentation device 108. For example, the data adjuster 120 of the illustrated example estimates media presentation session(s) for tuning sessions received from the example media presentation device 108 of the example media presentation location 110 that does not include a device to collect and/or send media presentation data (e.g., media presentation locations that do not include the example LPM 106 to the collection facility 104).

The example first media presentation location 102 is a location that has been statistically selected to develop media ratings data for a population/demographic of interest. According to the example of FIG. 1, person(s) of the household have registered with a metering device (e.g., the example local people meter 106) and provided the demographic information. Alternatively, the first example media presentation location 102 may be additional and/or alternative types of environments such as, for example, a room in a non-statistically selected household, a theater, a restaurant, a tavern, a retail location, an arena, etc. In some examples, the environment 100 may include a plurality of first media presentation locations 102 for which metering data is collected.

In the illustrated example of FIG. 1, the first media presentation location 102 includes the example media output device 104. The example media output device 104 of FIG. 1 is a television. Alternatively, the media output device 104 may be any other type of device for outputting media such as, for example, a radio, a computer monitor, a video game console, and/or any other device capable of presenting media to a user.

The example LPM 106 is in communication with the example media output device 104 to collect and/or capture signals emitted externally by the media output device 104. The LPM 106 may be coupled with the media output device 104 via wired and/or wireless connection. The example LPM 106 may be implemented in connection with additional and/or alternative types of media presentation devices such as, for example, a radio, a computer monitor, a video game console, and/or any other device capable to present media to a user. The LPM 106 may be a portable people meter, a cell phone, a computing device, a sensor, and/or any other device capable of metering user exposure to media. The media presentation location 102 may include a plurality of LPMs 106. In such examples, the plurality of the LPMs 106 may be used to monitor media exposure for multiple users and/or media output devices 104.

In some examples, the example LPM 106 includes a set of buttons assigned to audience members to determine which of the audience members is watching the example media output device 104. The LPM 106 may periodically prompt the audience members via a set of LEDs, a display screen, and/or an audible tone, to indicate that the audience member is present at the example first media presentation location 102 by pressing an assigned button. To decrease the number of prompts and, thus, the number of intrusions imposed upon the media consumption experience of the audience members, the LPM 106 prompts only when unidentified audience members are located in the first media presentation location 102 and/or only after the LPM 106 detects a channel change and/or a change in state of the media output device 104. In other examples, the LPM 106 may include at least one sensor (e.g., a camera, 3-dimensional sensor, etc.) and/or be communicatively coupled to at least one sensor that detects a presence of the user in the first example media presentation location 102. The example LPM 106 transmits metering data to a media researcher and/or a marketing entity. The example metering data includes the media presentation data (e.g., data related to media presented while the media output device 104 is on and a user is present). The metering data may further include a household identification, a tuner key, a presentation start time, a presentation end time, a channel key, etc., as further described in FIG. 6.

The media presentation device 108 of the illustrated example of FIG. 1 is installed by a service provider (e.g., cable media service provider, a radio frequency (RF) media provider, a satellite media service provider, etc.) to present media to an audience member through the example media output device 104. In the illustrated example of FIG. 1, the example media presentation device 108 is a STB. Alternatively, the example media presentation device 108 may be an over the top device, a video game counsel, a digital video recorder (DVR), a digital versatile disc (DVD) player, a receiver, a router, a server, and/or any device that receives media from a service provider. In some examples, the media presentation device 108 may implement a DVR and/or DVD player. The example media presentation device 108 includes a unique serial number that, when associated with subscriber information, allows an audience measurement entity, a marketing entity, and/or any other entity to ascertain specific subscriber behavior information. Additionally, the example media presentation device 108 transmits tuning data (e.g., data related to tuned channels while the media presentation device 108 is on) to the example collection facility 114. Although the example media output device 104, the example LPM 106, and the example media presentation device 108 in the first example media presentation location 102 are separate devices, one or more of the media output device 104, the LPM 106, and/or the media presentation device 108 may be combined.

The example second media presentation location 110 includes the example media output device 104 and the example media presentation device 108, but does not include the example LPM 106. Accordingly, media presentation data is not collected at the example second media presentation location 110. However, tuning data is collected by the example media presentation device 108. Such tuning data includes data collected by the media presentation device 108 (e.g., which channel the media presentation device 108 was tuned to) but may not include presentation session information from the example media presentation device 108 (e.g., information related to when the media output device 104 is powered on and/or an audience member is present). Therefore tuning data from the example LPM 106 may be misleading. In some examples, the second media presentation location 110 may include a second plurality of media presentation locations 110.

Metering data from the example LPM 106 and/or tuning data from the example media presentation device 108 is transmitted to the example collection facility 114 via the example network 112. The example network 112 may be implemented using any type of public or private network such as, but not limited to, the Internet, a telephone network, a local area network (LAN), a cable network, and/or a wireless network. To enable communication via the network 112, the example media presentation device 108 includes a communication interface that enables a connection to an Ethernet, a digital subscriber line (DSL), a telephone line, a coaxial cable, or any wireless connection, etc.

The example collection facility 114 receives, processes, stores, and/or reports presentation data related to metering data received from the LPM 106 and/or tuning data from the media presentation device 108 periodically and/or upon a request by the collection facility 114. In some examples, the collection facility 114 receives the tuning data from a service provider associated with the media presentation device 108 instead of and/or in addition to obtaining the example tuning data from the example media presentation device 108.

According to the illustrated example, the collection facility 114 is hosted by an audience measurement entity. Alternatively the collector facility may be hosted by any other entity or may be co-hosted by an audience measurement entity and another entity(ies). For example, tuning data may be collected from the example media presentation devices 108 by a media provider (e.g., a cable television provider, a satellite television provider, etc.) and metering data may be collected from the example LPM(s) 106 by an audience measurement entity cooperating with the media provider to gain access to the tuning data. The example collection facility 114 includes the example tuning storage 116 and the example metering storage 118.

The example tuning storage 116 is a database that stores tuning data received from the example media presentation device 108 and the example metering storage 118 is a database that stores metering data from the example LPM(s) 106. The example tuning storage 116 and metering storage 118 may be implemented by any one of more of a database, a server, and/or any other data structure to store data. According to the illustrated example, the example tuning storage 116 and the example metering storage 118 are communicatively coupled with the first example media presentation location(s) 102 and the second example media presentation location(s) 110 via the example network 112. Alternatively, the example tuning storage 116 and/or the example metering storage 118 may receive data in any other manner (e.g., tuning data and/or media presentation data may be collected by a third-party and transferred to the collection facility 114 via the network 112 or any other path).

The example data adjuster 120 processes metering data (e.g., metering data received from the metering storage 118)

to create a tuning session(s) (e.g., based on a period of time between channel changes) and a presentation session(s) (e.g., based on when the media was presented by the media presentation device 108 on the media output device 104). The example data adjuster 120 integrates demographic data with the compiled presentation data to generate demographic statistical information. The data adjuster 120 of the illustrated example generates models to estimate presentation session data for a received tuning session received from the example media presentation devices 108. When the example collection facility 114 receives tuning data from the example media presentation devices 108 and/or from a service provider associated with the media presentation devices 108, the example data adjuster 120 estimates and reports presentation session data based on a comparison of the tuning data and the generated models, as further described in FIG. 2.

In operation, there are two steps to estimating presentation session(s) for tuning data received from the example media presentation device 108. The first step is a model generation step that includes generating models based on determined tuning session(s) and presentation session(s) from metering data. The second step is a media presentation estimation step that includes estimating presentation sessions for received tuning data.

During the model generation step, the example LPM 106 collects metering data at the media presentation location 102. As previously described, the metering data includes data related to media presented to and/or exposed to audience members of the media presentation device 108. In some examples, the metering data includes demographics for the users of the media output device 104, data related to the media presented by the media presentation device 108, timestamps for the media exposure, data related to channel changes, data related to media output device 104 on/off status, etc. The example LPM 106 transmits the metering data to the example collection facility 114 via the example network 112 to be stored in the example metering storage 118. As previously described, the metering data is received (e.g., from the LPM 106) periodically and/or upon a request by the collection facility 114. Typically, multiple of the LPMs 106 associated with respective ones of the media presentation locations 102 will send the metering data to the example metering storage 118.

The example data adjuster 120 analyzes the metering data from the example metering storage 118 to create tuning sessions and presentation sessions based on the metering data. The data adjuster 120 determines tuning session(s) based on a period of time between channel changes indicated in the metering data. The example data adjuster 120 also determines presentation session(s) for the determined tuning session(s) based on a time and/or date of when the media was actually viewed by a user (e.g., the media output device 104 was detected as being on and a user was determined to be present to view the media output device 104). After the tuning session(s) and the presentation session(s) are determined, the data adjuster 120 of the illustrated example creates and/or updates a model based on a duration(s) of the tuning session(s), as further described in conjunction with FIG. 2.

During the media presentation estimation step, the media presentation device 108 collects tuning data related to which channel a media presentation device 108 is tuned to while the media presentation device 108 is on. As previously described, the tuning data does not include presentation session data (e.g., data related to media presented while the media output device 104 is on and a user is present). The example media presentation device 108 transmits the tuning data to the example tuning storage 116 of the example collection facility 114 via the example network 112. As previously described, the tuning data is received (e.g., from the media presentation device 108) periodically and/or upon a request by the collection facility 114. In some examples, the tuning data may be collected by the service provider associated with the media presentation device 108. In such examples, the service provider may transmit the tuning data directly to the example collection facility 114 to be stored in the tuning storage 116.

The example data adjuster 120 determines a duration of a tuning session from the received tuning data. The example data adjuster 120 estimates presentation session data for the tuning session based on the created models. For example, the data adjuster 120 may estimate a 120-minute presentation session based on receiving a 180-minute tuning session. The example data adjuster 120 generates reports based on the estimated presentation session data. The reports may be generated at preset times (e.g., hourly, daily, monthly, etc.) and/or may be initiated by user request. Additionally, the reports may include data from one or more media presentation locations (e.g., such as the first and second media presentation locations 102, 110). In some examples, the reports may include demographic and/or other statistical information, as further described in FIGS. 8A-9.

Figure 2:
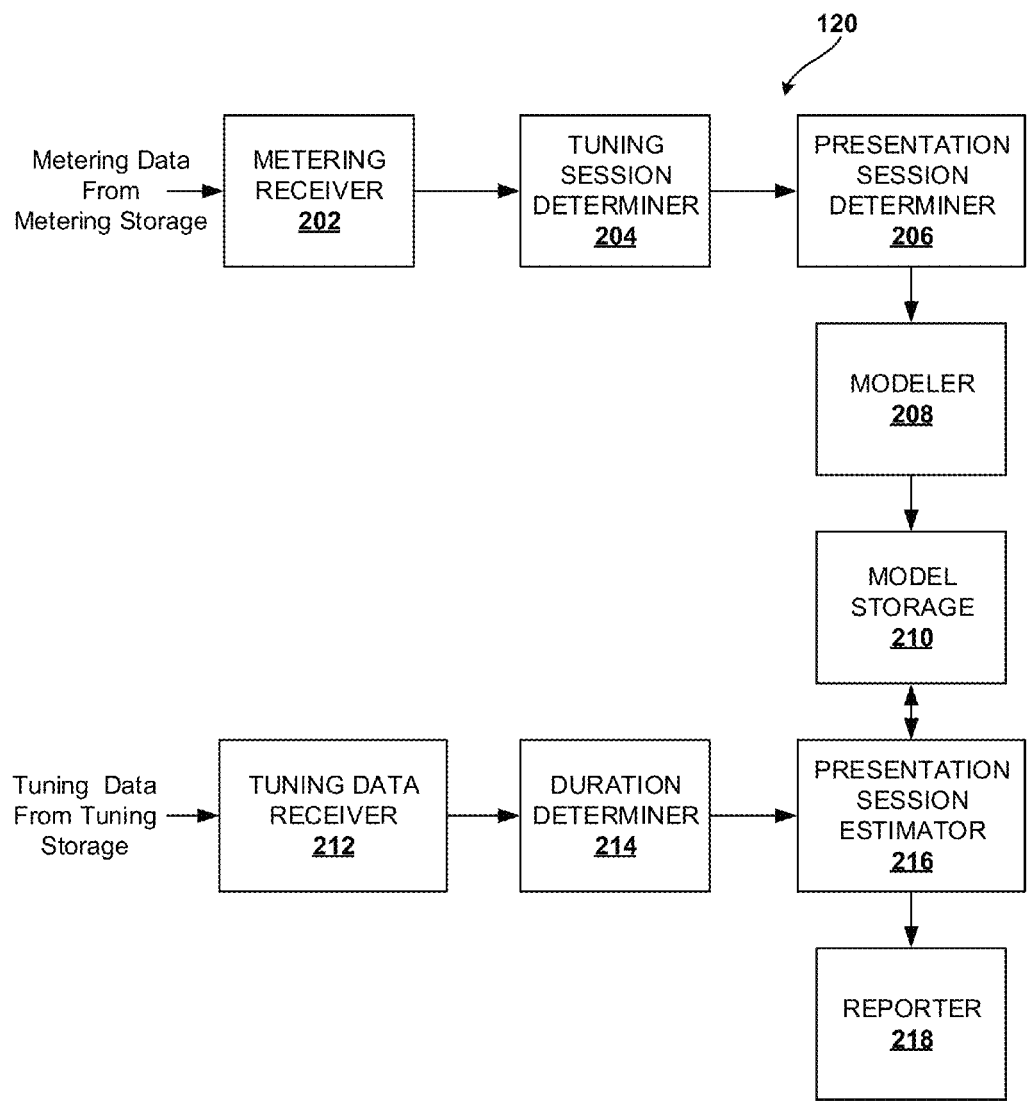
FIG. 2 is a block diagram of an example implementation of the data adjuster of FIG. 1.

FIG. 2 is block diagram of an example implementation of the example data adjuster 120 of FIG. 1 to estimate presentation sessions for tuning data based on models generated from metering data. The example data adjuster 120 includes an example metering receiver 202, and example tuning session determiner 204, an example presentation session determiner 206, an example modeler 208, an example model storage 210, an example tuning data receiver 212, an example duration determiner 214, an example presentation session estimator 216, and an example reporter 218.

The example metering receiver 202 of FIG. 2 receives metering data from the example LPM 106 and sends the received metering data to the example tuning session determiner 204 for further processing. In some examples, the metering receiver 202 receives metering data from the example metering storage 118. In some examples, the metering receiver 202 receives metering data from the example LPM(s) 106. In some examples, the metering receiver 202 receives metering data from both the example metering storage 118 and the example LPM(s) 106. The metering receiver 202 may include a network adapter and/or server for receiving metering data from the example metering storage 118 and/or the example LPM(s) 106 (e.g., via the example network 112) through a wired and/or wireless connection.

The example tuning session determiner 204 analyzes metering data received via the example metering receiver 202 to create a tuning session(s) based on a period of time between channel changes. Alternatively, the tuning session determiner 204 may generate the created tuning session(s) based on a period of time between any interaction with the media output device 104, the LPM 106, and/or the media presentation device 108. According to the illustrated example, the example tuning session determiner 204 determines a new tuning session for each channel change identified in the metering creates a new tuning session. In this manner, a tuning session is representative of the period of time between each channel change. For example, if the metering data includes a first channel change at 4:00 PM and a second subsequent channel change at 5:30 PM on the same day, the example tuning session determiner 204 creates a 90-minute tuning session representative of the period from 4:00 PM to 5:30 PM. Once a tuning session(s) has been determined from the metering data, the example tuning session determiner 204 sends data for the determined tuning session(s) to the example presentation session determiner 206.

The example presentation session determiner 206 receives data for a tuning session(s) received from the example tuning session determiner 204 and further analyzes created tuning session(s) to determine a presentation session(s) within the tuning session(s). The presentation sessions are determined based on when the media presentation device 108 is actually presenting media to an audience member (e.g., the example media output device 104 is on and/or an audience member is present). In some examples, the metering data may include user identifiers identifying which user is located in the example media presentation location 102 while the example media output device 104 is on. In such examples, the presentation session determiner 206 may not credit a duration as a presentation session if an audience member is not present while the media output device 104 is on. Once the presentation session(s) is determined, the example presentation session determiner 206 transmits the created tuning session data and the determined presentation session data to the example modeler 208.

The example modeler 208 creates and/or updates models based on tuning session data and presentation session data received from the example. The example modeler 208 integrates the presentation session data in a model with a corresponding tuning session length. For example, if the example tuning session determiner 204 determines presentation session data from a 500-minute tuning session, the example modeler 208 will store the corresponding presentation session data in a 500-minute tuning session model. In some examples, the example modeler 208 updates the model based on the total presentation session for the tuning session. For example, if the 500-minute tuning session includes a total presentation session of 320 minutes, the example modeler 208 will update the 500-minute tuning session model to include the 320 minute presentation session, as further described in FIG. 8A. In some examples, the example modeler 208 updates the model based on durations associated with the presentation session for the tuning session. For example, if during the 500 minute tuning session, there were two presentation sessions (e.g., from the 0 minute mark to the 200 minute mark and from the 380 minute mark to the 500 minute mark), the example modeler 208 will update the 500-minute tuning session model to include data from the periods of time (e.g., 0-200 minutes and 380-500 minutes) associated with the presentation sessions, as further described in FIG. 8D. Additionally, the example modeler 208 may update the model based on various conditional probabilities associated with the presentation session(s), as further described in FIGS. 8B, 8C, 8E, and 9. Once the example modeler 208 has created and/or updated a model, the example modeler 208 stores the model in the example modal storage 210.

The example model storage 210 of FIG. 2 stores models created and/or updated by the example modeler 208. In some examples, the model storage 210 includes hardware, software, or firmware to store data locally in the example data adjuster 120. Alternatively, the model storage 210 is located outside the example data adjuster 120 (e.g., in a database and/or a cloud). The models stored in the example model storage 210 may be updated (e.g., based on additional metering data) and/or used to estimate presentation sessions (e.g., based on the tuning data).

The example tuning data receiver 212 of FIG. 2 receives tuning data from the example media presentation device 108 and/or a service provider and sends the received tuning data to the example duration determiner 214 for further processing. In some examples, the tuning data receiver 212 receives metering data from the example tuning storage 116. Alternatively, the tuning data receiver 212 may receive metering data from the example media presentation device(s) 108. In some examples, the tuning data receiver 212 receives metering data from both the example tuning storage 116 and the example media presentation device(s) 108. The tuning data receiver 212 may include a network adapter and/or server for receiving metering data from the example tuning storage 116 and/or the example media presentation device(s) 108 (e.g., via the example network 112) via a wired and/or wireless connection.

The example duration determiner 214 analyzes tuning data to determine a duration of a tuning session from the media presentation device 108. As previously described, a tuning session is based on a period time between channel changes of the media presentation device 108. The tuning data does not include presentation session data. To estimate accurate presentation session for the tuning data, the example duration determiner 214 determines the duration of the tuning session so that an appropriate model may be retrieved to determine the estimate. The example duration determiner 214 transmits tuning data including the tuning session duration to the example presentation session estimator 216 for further processing.

The example presentation session estimator 216 estimates presentation session for tuning data received from the example tuning data receiver 212 via the example duration determiner 214 based on presentation session data from a model stored in the example model storage 210. The presentation session estimator 216 retrieves, from the example model storage 210, a model with a tuning session length that matches determined tuning session duration determined by the example duration determiner 214. For example, if the tuning data received from the example model storage 210 a 500 minute tuning session, the presentation session estimator 216 retrieves the 500-minute tuning session model from the example memory 210. Since the tuning data does not differentiate between time when the media output device 104 is on and the media output device 104 is off and/or when an audience member is present, the example presentation session estimator 216 estimates presentation sessions to account for periods of time when the media presentation device is on but the media output device 104 is off and/or an audience member is not present. The example presentation session estimator 216 may estimate additional presentation session data based on, for example, an initial presentation session (e.g., the first presentation session in the tuning session), a final presentation session (e.g., the last presentation session in the tuning session, and/or a total presentation session (e.g., the total presentation minutes in the tuning session) based on the data stored in the corresponding model. For example, the presentation session estimator 216 may receive a 200-minute model(s) while estimating a presentation session for a 200-minute tuning session. The presentation session estimator 216 may estimate, based on the 200-minute model, an initial tuning session of 60 minutes, an final presentation session of 30 minutes, and an total presentation session estimate of 90 minutes based on user and/or administrator settings. In some examples, the settings may be based on statistical analysis (e.g., expected value, weighted average, standard deviation, minimum and/or maximum percentages of presentation sessions from the model(s) etc.).

In some examples, the example presentation session estimator 216 bins (e.g., groups) data from multiple models within a threshold range when the number of entries in a particular model does not satisfy a minimum threshold number of entries. For example, if a 65-minute tuning duration is determined from tuning data and the 65-minute tuning session model does not meet a threshold number (e.g., minimum) of entries, the example presentation session estimator 216 may group data from models of similar tuning session length within a threshold range. For example, if the threshold range is 4 minutes, the data from the 63-minute tuning session model, the 64-minute tuning session model, the 66-minute tuning session model, and the 67-minute tuning session model may be combined with the data from the 65-minute tuning session model. In this manner, the number of entries may be increased until the threshold number of entries is satisfied. In some examples, the threshold number of entries for a model and the minimum threshold range may be set and/or adjusted by a user and/or an administrator.

The example reporter 218 of FIG. 2 generates reports of data received, determined, and/or generated by the example data adjuster 120. The example reporter 218 generates reports including media presentation session data, the metering data from the example LPM 106, tuning data from the media presentation device 108, data relating models generated by the example modeler 208, presentation session estimator 216 settings, and/or any other data relating to the LPM 106 and/or the media presentation device 108. The reports may include statistical analysis including conditional distributions, cumulative distributions, expected values, etc. For example, the reports may illustrate that 15% of 200-minute tuning sessions from media presentation devices 108 include only 120 minutes of presentation time, that 35% of the 200-minute tuning session was being presented at the $158^{th}$ minute, that the expected total presentation minutes for the 200-minute tuning session is 150 minutes, etc. The reports may be preset and/or customized by a user and/or administrator to include information relevant to the user and/or administrator.

While an example manner of implementing the example data adjuster 120 of FIG. 1 is illustrated in FIG. 2, one or more elements, processes and/or devices illustrated in FIG. 2 may be combined, divided, re-arranged, omitted, eliminated and/or implemented in any other way. Further, the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example the example data adjuster 120, of FIG. 2 may be implemented by hardware, machine readable instructions, software, firmware and/or any combination of hardware, machine readable instructions, software and/or firmware. Thus, for example, any of the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example the example data adjuster 120, of FIG. 2 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example the example data adjuster 120, of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example data adjuster 120 of FIG. 2 may include one or more elements, processes and/or devices in addition to, or instead of, those illustrated in FIG. 2, and/or may include more than one of any or all of the illustrated elements, processes and devices.

Figure 3:
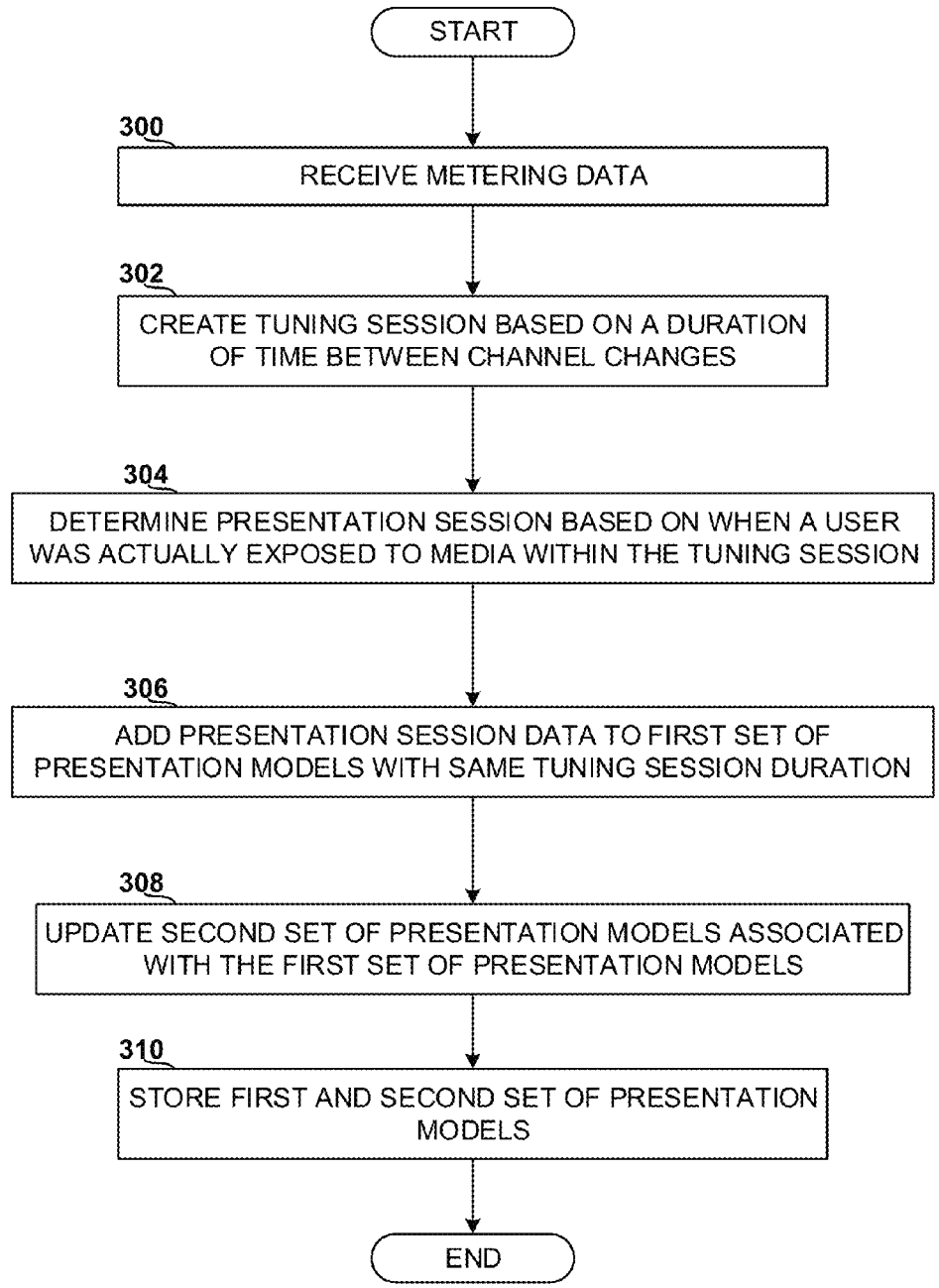
FIGS. 3-5 are flowcharts illustrating example machine readable instructions that may be executed to implement the example data adjuster of FIGS. 1 and/or 2.
Figure 4:
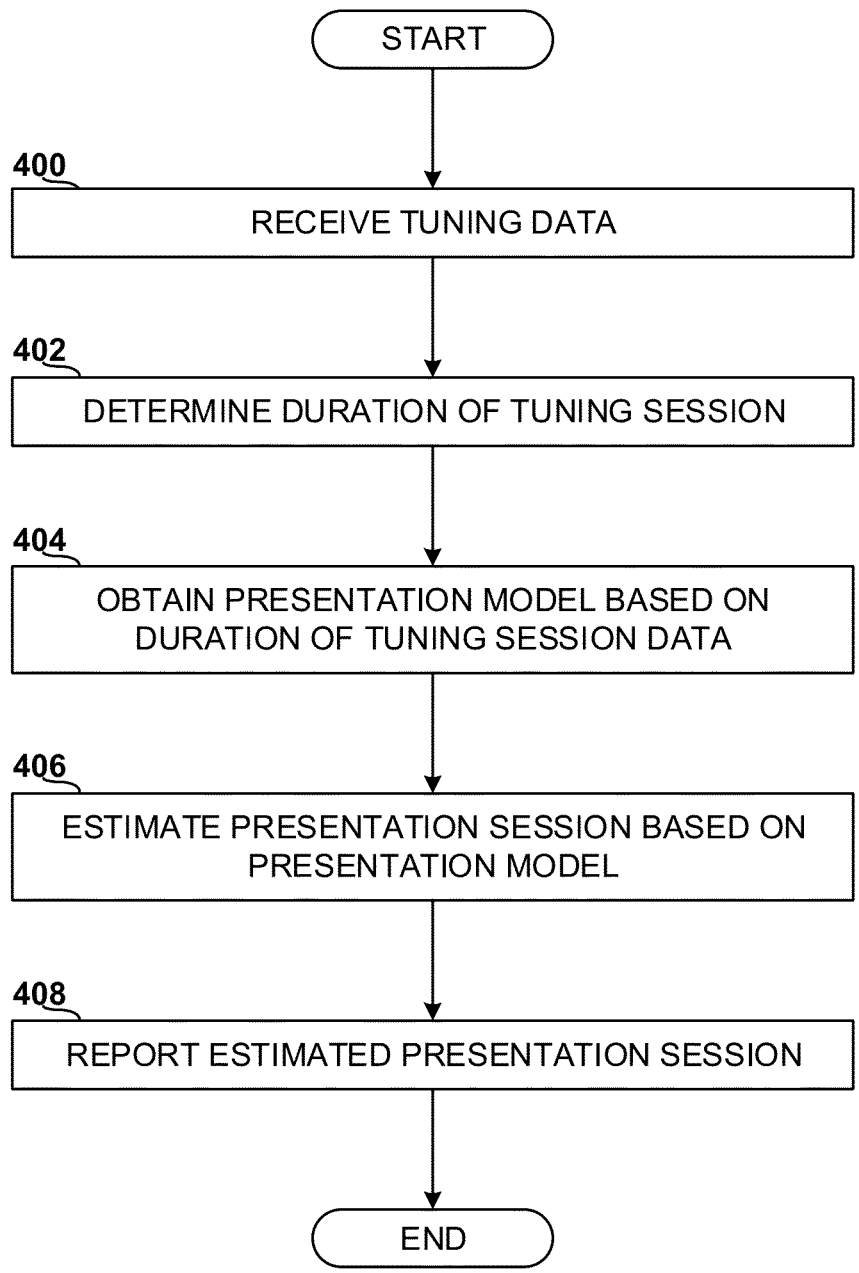
Figure 5:
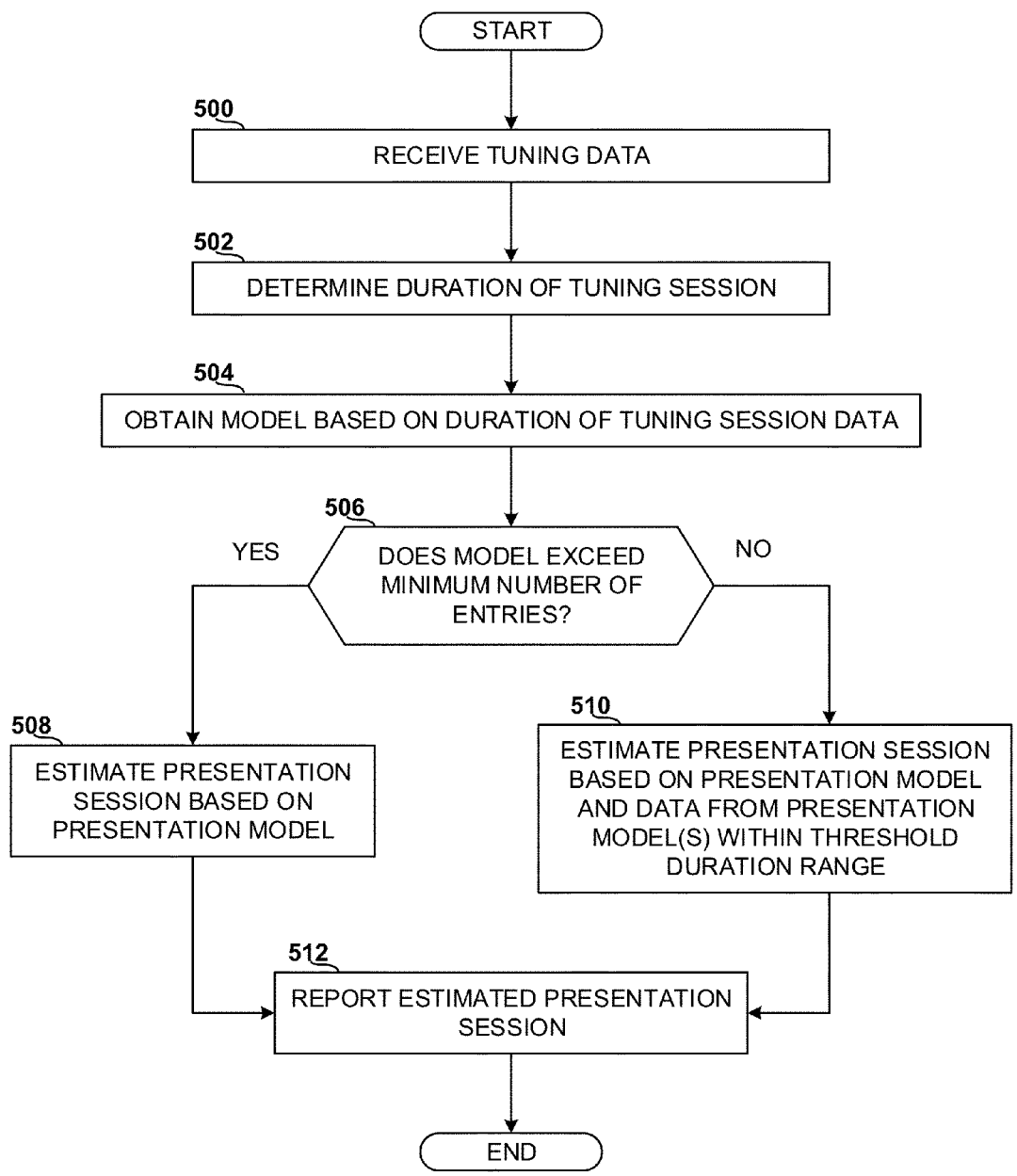

Flowcharts representative of example machine readable instructions for implementing the example data adjuster 120 of FIG. 2 are shown in FIG. 3-5. In the examples, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-5, many other methods of implementing the example data adjuster 120 of FIG. 2 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8A:
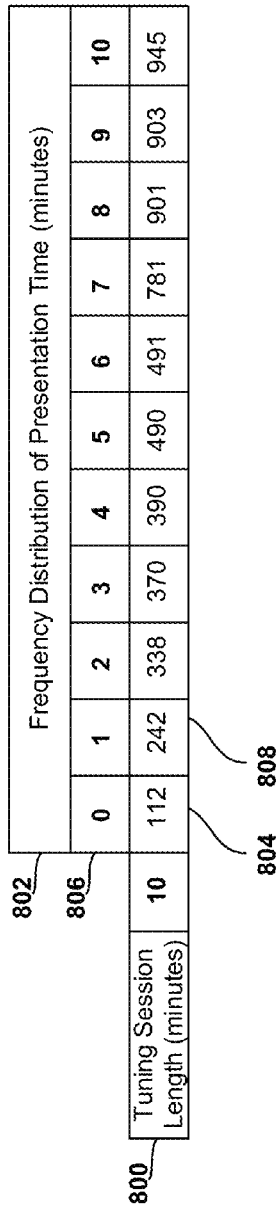
Figure 8B:
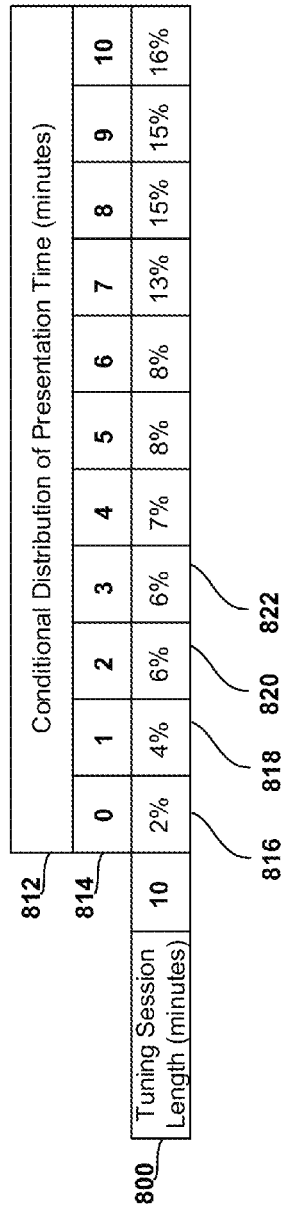
Figure 8C:
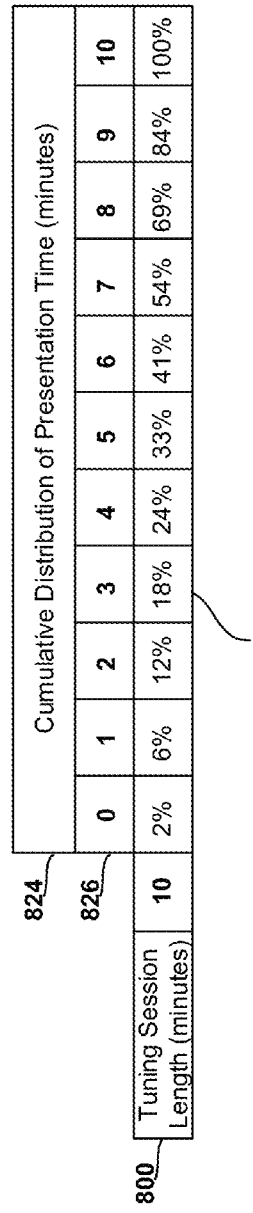
Figure 9:
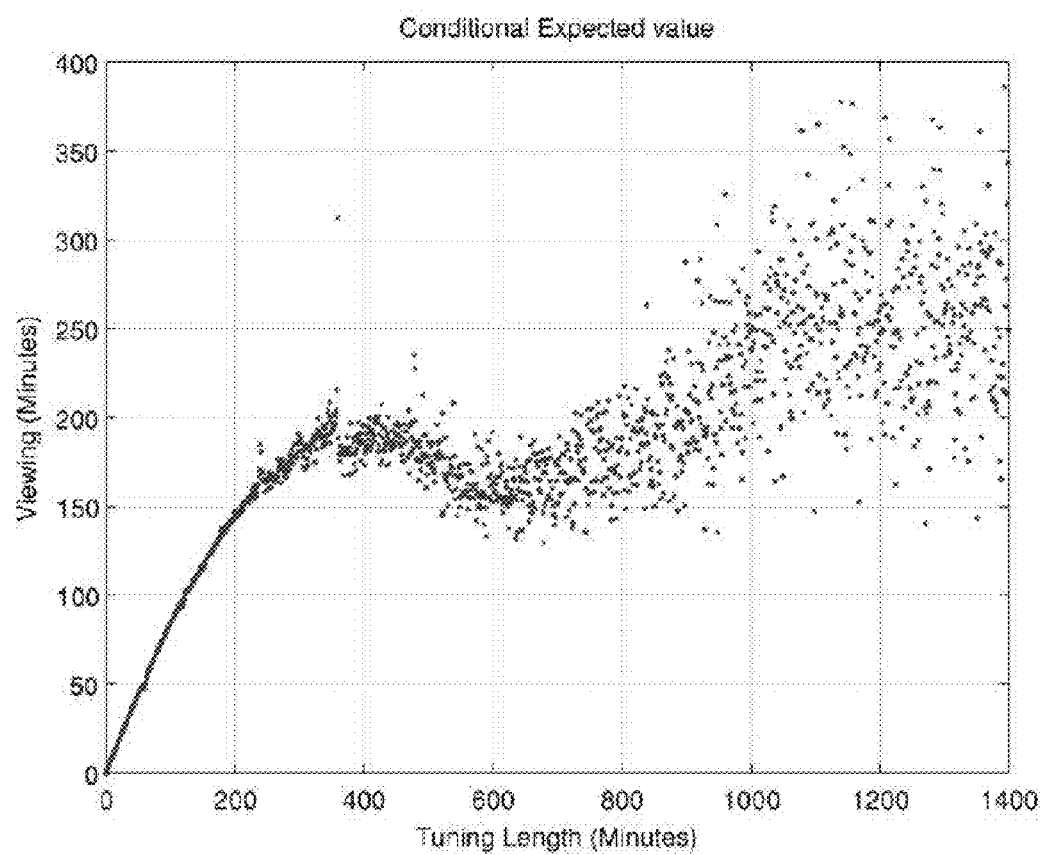
FIG. 9 is an example graph illustrating expected total presentation session durations generated by the generated by the data adjuster of FIGS. 1 and/or 2 based on received tuning session durations in accordance with the teachings of this disclosure.

The example machine readable instructions illustrated in FIG. 3 may be executed to cause the example data adjuster 120 of FIG. 2 to create a model based on metering data and determine presentation session data from tuning data of the example media presentation device(s) 108 (e.g., the model generation step) in conjunction with FIGS. 7-9.

At block 300, the metering receiver 202 receives metering data from the example LPM 106. As previously described, the metering data contains detailed media exposure data for the example media presentation location 102 (e.g., for media from the example media presentation device 108 output by the example media output device 104. Example metering data is illustrated and further described in FIG. 6. At block 302, the tuning session determiner 204 creates a tuning session based on a period of time between channel changes. Alternatively, the example tuning session determiner 204 may create a tuning session based on any other events at the example media presentation location (e.g., a volume change, a detected user presence, etc.). Once the tuning session has been created, the example presentation session determiner 206 determines presentation sessions within the tuning session (block 304). Alternatively, presentation sessions may be determined prior to or in parallel with the creation of the tuning session. An example of presentation sessions within a tuning session is illustrated and further described in FIGS. 7A-7C.

At block 306, the example modeler 208 adds the presentation session data to a first set of models based on the tuning session length. For example, based on the determined tuning sessions, the example modeler 208 updates the example models by adding the presentation data to the first set of models (e.g., such as frequency distribution of total presentation time and frequency distribution of media presented at set times, as further described in FIGS. 8A and 8D). For example, if there are 50 minutes of total presentation session time for a 75-minute tuning session, the example modeler 208 adds a count for the total 50 minutes presentation session to a frequency distribution model for a 75-minute tuning session, as further described in FIG. 8A. Additionally, if the example modeler 208 determines that the 75-minute tuning session contains two presentation sessions (e.g., from 0-30 minutes and from 55-75 minutes), the example modeler 208 may update a 75-minute frequency distribution model based on every minute of the two presentation sessions (e.g., adds a count at 0 minute bucket, at a 1 minute bucket, at a 2 minute bucket, . . . , at a 30 minute bucket, at a 55 minute bucket, . . . , at a 75 minute bucket), as further described in FIG. 8D. Once the example modeler 208 updates the first set of models, the example modeler 208 updates a second set of models associated with the first set of models (block 308). For example, there may be various models (e.g., such as models of conditional distribution of total presentation time, models of cumulative distribution of total presentation time, models of conditional distribution of media presented at set times, models of conditional expected value, etc., as further described in FIGS. 8B, 8C, 8E, and 9) that are calculated based on the first set of models. For example, a 75-minute conditional distribution model is based on a number of counts in one bucket divided by the total number of counts. In such examples, the conditional probability for a 20-minute tuning session may include 100 counts for a presentation session totaling 15 minutes and the 20-minute tuning session may have a total of 500 counts, therefore the conditional probability for a 15 minute total presentation session based on a 20-minute tuning session is 20% (e.g., 100/500). However if additional metering data is received, the conditional data is calculated based on updates to the first set of models. For example, if 500 more 20-minute tuning sessions are added to the first set of models and none of the 500 20-minute tuning sessions include 15-minute total presentation sessions, the conditional probability for a 15-minute total presentation session would lower to 10% (e.g., 100/1000). In such examples, the presentation session data is first added to the first set of models and then the second set of models may be updated (e.g., re-calculated) based on the updated first set. At block 310, once the models have been updated, the models are stored in the example model storage 210 to be used by the presentation session estimator 216, as further described in FIG. 4.

The example machine readable instructions illustrated in FIG. 4 may be executed to cause the example data adjuster 120 of FIG. 2 to estimate presentation sessions from tuning data from the example media presentation device 108 (e.g., the media presentation estimation step).

At block 400, the example tuning data receiver 212 receives tuning data from the example media presentation device 108. As previously described, the tuning data includes data relating to which channel the media presentation device 108 was tuned to while the media presentation device 108 is on. Tuning data may be inaccurate because tuning data assumes that the media output device 104 is on and a viewer is present whenever the media presentation device is on. Therefore, tuning data does not provide presentation session data (e.g., data related to when the media output device 104 is on and a user is present) within a tuning session.

At block 402, the example duration determiner 214 determines a duration of a tuning session based on the tuning data. Once the duration the tuning session has been determined, the example presentation session estimator 216 retrieves a corresponding model from the example model storage 210 (block 404). Since the example models are divided by tuning session durations, the presentation session estimator 216 retrieves a model that corresponds to (e.g., matches with) the duration the received tuning session. At block 406, the example presentation session estimator 216 estimates presentation session data (e.g., a total estimated presentation session, a period for a presentation session at the beginning and/or end of the tuning session, and/or any other data based on the stored models as further described in FIGS. 8A-E) based on user settings. For example, a user may create setting for an initial presentation session based a when the total percentage of users in a model drops below 80%. In such examples, if a 10 minute tuning session is received from the example tuning data receiver 212, the presentation session estimator 216 receives a 10-minute model (e.g., such as the conditional distribution of media presented at set times model of FIG. 8E). Since the $4^{th}$ minute of the model of FIG. 8E is the first time that the conditional percentage drops below 80% (e.g., at the $4^{th}$ minute it is 75%), the presentation session estimator 216 estimates an initial presentation session from the $0^{th}$ minute to the $3^{rd}$ minute. As previously described, the user settings may be preset of configured based on user and/or administrator preferences. At block 408, the example reporter 218 generates a report including the estimated presentation session data. Additionally, the report may include the tuning data, the metering data, demographic data, any and/or all of the stored models, and/or any other data related to the LPM 106 and/or the media presentation device 108. As previously described, the data reported on the reporter may be preset of customized.

The example machine readable instructions illustrated in FIG. 5 include alternative instructions to cause the example data adjuster 120 of FIG. 2 to estimate presentation sessions from tuning data from the example media presentation device 108. The example machine readable instructions cause the example data adjuster 120 of FIG. 2 to bin (e.g., group) models based on tuning session durations.

At block 500, the example tuning data receiver 212 receives tuning data from the example media presentation device 108. As previously described, the tuning data includes data relating to which channel the media presentation device 108 was tuned to while the media presentation device 108 is powered on. Tuning data may be inaccurate because tuning data assumes that the media output device 104 is on and a viewer is present whenever the media presentation device is on. Therefore, tuning data does not provide presentation session data (e.g., data related to when the media output device 104 is on and a user is present) within a tuning session.

At block 502, the example duration determiner 214 determines a duration of a tuning session based on the tuning data. Once the duration the tuning session has been determined, the example presentation session estimator 216 retrieves a corresponding model from the example model storage 210 (block 504). Since example the models are divided by tuning session durations, the presentation session estimator 216 retrieves a model that corresponds to (e.g., matches with) the duration the received tuning session.

At block 506, the presentation session estimator 216 determines if the obtained model exceeds a minimum number of entries. The minimum number of entries may be predetermined and/or based on user and/or administrator preferences. If a model has a limited number of entries (e.g., small sample size), the presentation session estimator 216 may inaccurately estimate presentation session data. As previously described, the example presentation session estimator 216 may bin (e.g., group) similar models together to increase the number of entries above the minimum number of entries. If the model does exceed the minimum number of entries, the example presentation session estimator 216 estimates presentation session data (e.g., a total estimated presentation session, a period for a presentation session at the beginning and/or end of the tuning session, and/or any other data based on the stored models as further described in FIGS. 8A-E) (block 508) based on user settings. For example, a user may create setting for an initial presentation session based a when the total percentage of users in a model drops below 80%. In such examples, if a 10 minute tuning session is received from the example tuning data receiver 212, the presentation session estimator 216 receives a 10-minute model (e.g., such as the conditional distribution of media presented at set times model of FIG. 8E). Since the $4^{th}$ minute of the model of FIG. 8E is the first time that the conditional percentage drops below 80% (e.g., at the $4^{th}$ minute it is 75%), the presentation session estimator 216 estimates an initial presentation session from the $0^{th}$ minute to the $3^{rd}$ minute. As previously described, the user settings may be preset of configured based on user and/or administrator preferences.

If the model does not exceed the minimum number of entries, the example presentation session estimator 216 estimates presentation session data based on the model and data from other models within a threshold duration range (block 510). In this manner, the example presentation session estimator 216 can increase the number of entries by gathering data from models with similar tuning session durations. For example, if a threshold range is 5 minutes and a 30-minute tuning session model does not meet the minimum number of entries, the presentations session estimator 216 may combine entries from the 28-minute tuning session model, the 29-minute tuning session model, the 30-minute tuning session model, the 32-minute tuning session model, and the 33-minute tuning session model. In some examples, the presentation session estimator 216 may add entries from one model at a time until the minimum threshold is met. The threshold range and/or the minimum number of entries may be preset and/or based on user and/or administrator preferences. Once, the minimum threshold is met, the example presentation session estimator 216 estimates presentation session data based on the binned (e.g., grouped) models (e.g., a total estimated presentation session, an duration for a presentation session at the beginning and/or end of the tuning session, and/or any other data based on the stored models as further described in FIGS. 8A-E). At block 512, the example reporter 218 generates a report including the estimated presentation session data. Additionally, the report may include the tuning data, the metering data, demographic data, any and/or all of the stored models, presentation session data prior to binning, and/or any other data related to the LPM 106 and/or the media presentation device 108.

FIG. 6 is an illustration of example metering data 600 from the example LPM 106. The example metering data 600 includes a household identification (ID) 602, a tuner key 604, a start presentation time 606, an end presentation time 608, a channel key 610, a genre 612, a presentation weight date key 614, a valid data flag 616, and a source 618.

The example household ID 602 of FIG. 6 identifies which example media presentation location 102 transmitted the metering data 600. In this example, there is one household ID 602, namely '30006.' However, there may be many household IDs from various media presentation locations 102 within the metering data 600. The example tuner key 604 is an identification number for the media output device 104. Since there may be the media presentation location 102 with multiple media presentation devices 102, the tuner key 604 identifies which media output device 104 was being used. The example start time 606 is a timestamp based on a start of a presentation session (e.g., when the media presentation device 108 was actually presenting media on the media output device 104). The example end time 608 is a timestamp based an end of a presentation session. The example channel key 610 identifies a channel tuned by the media presentation device 108. The example genre 612 identifies the genre of the media tuned to on the media presentation device 108 during the presentation session. The example presentation weight date key 614 is a code representative of a date of the end time 608. The example valid data flag 616 is a Boolean value that identifies whether the metering data is valid. The metering data may not be valid if there is an error in the metering data (e.g., the metering data is corrupted, the metering data is missing information, etc.). The example source 618 identifies a source (e.g., a videocassette recorder (VCR), DVD, cable, antenna, video game counsel, etc.) of the media presentation device 618. The source 618 may change if, for example, the user is watching a DVD. Additionally, the metering data 600 may contain additional columns for data related to other aspects of audience member data. For example, the metering data may contain data identifying whether or not a user(s) is present, demographics relating to the user(s), and/or an identifier for the user(s) present during a presentation session. Alternatively, the metering data may only display data while a user is present and omit any data while the user is not present. For example, the example LPM 106 may adjust the example metering data 600 so that the metering data 600 does not include data from time durations when a user is not present.

When the example metering data 600 of FIG. 6 is received by the example collection facility 114 from the example LPM 106, the example tuning session determiner 204 tuning sessions based on a period time between channel changes by analyzing the metering data 600. The example columns 620 represent data from a period time between channel changes. In this example, the tuning session determiner 204 identifies the example columns 620 as an example tuning session as further described in in FIGS. 7A-C.

FIGS. 7A-C illustrate an example of determining a tuning session and presentation sessions within the tuning session based on the example metering data 600 of FIG. 6. In the illustrated example, the tuning session determiner 204 determines tuning session based on a period of time between channel changes. FIG. 7A displays the columns 620 from the example metering data 600 of FIG. 6. FIG. 7B displays information that may be extracted from the example columns 620 to determine the tuning session and the presentation sessions. For example, based on the information from the example columns 620, the presentation session determiner 206 determines that at time 00:25:00 media output device '186242092' from household '50006' was turned off after watching a channel associated with '294984.' At time 00:34:00, the media output device '186242092' was turned on and the channel was changed to a channel associated with a channel key '2875552.' At time 02:26:00, the media output device '186242092' was turned off. At time 04:52:00, the media output device '186242092' was turned back on while remaining on the channel associated with the channel key '2875552.' At time 05:46:00, the media output device '186242092' was turned off. At time 20:50:00, the media output device '186242092' was turned back on while remaining on the channel associated with the channel key '2875552.' At time 21:35:00, the media output device '186242092' was turned off. At time 22:41:00, the media output device '186242092' was turned back on and the channel was changed to a channel associated with the channel key '294984.'

FIG. 7C illustrates an example tuning session and example presentation sessions determined for the metering data from columns 620 of FIG. 7A. Since the channel was changed at 00:34:00 and then again at 22:41:00, the example tuning session determiner 204 generates an example tuning session of 1,327 minutes (e.g., the period of time between channel changes). Once the tuning session is created, the presentation session determiner 206 determines presentation sessions based on the periods of time that media from the media output device '186242092' was actually presented within the tuning session (e.g., the media output device '186242092' was on and a user was viewing the media output device '186242092'). For example, the presentation session determiner 206 analysis the start and end times from the metering data from columns 620 to determine when the media output device 104 was on and when the media output device 104 was off. The presentation sessions only include periods of time while the media output device 104 is on. In some examples, the metering data in columns 620 may only include data when a user is present. In such examples, the presentation sessions are based on when the media output device 104 is on. In some examples, the metering data in columns 620 may include additional data such as data related to the presence of audience members. In such examples, the presentation session determiner 206 may need to determine if, and/or which, audience members are present while the media output device 104 is on. Based on the example columns 620, the presentation session determiner 206 determines that the presentation session periods are 00:34:00-02:56:00 (e.g., 142 minutes), 04:52:00-0:5:46:00 (e.g., 54 minutes), and 20:50:00-21:35:00 (e.g., 45 minutes). The total presentation time for the 1,327 minute tuning session is 238 minutes (e.g., 142+54+42=238). In this example, once the example presentation session determiner 206 determines presentation session data based on the created tuning session, the example modeler 208 adds the presentation session data to a model corresponding to a tuning session duration 1,327 minutes, as further described in FIGS. 8A-8E.

FIGS. 8A-E display example models displaying various distributions based on presentation session data for an example 10-minute tuning session. The example models of 8A-E are based on a total of 5963 10-minute tuning sessions collected from metering data of the example LPM 106 in FIG. 2, as previously described in FIGS. 7A-C.

FIG. 8A displays an example model of an example frequency distribution of total presentation time based on the gathered 10-minute tuning session. Additionally, other models may be created for tuning sessions of varying lengths (e.g., 1-minute tuning session, 5-minute tuning session, 60-minute tuning session, 720-minute tuning session, etc.). Alternatively, one model may be generated with multiple rows representing multiple tuning session lengths.

The example model of FIG. 8A includes an example frequency distribution of presentation times 802 broken into one minute intervals for the example 10-minute tuning session 800. In some examples, the presentation times 802 represent a range of times. For example, the example presentation time '0' labeled 806 may include all time from 00:00:00 to 00:00:59, 00:00:00 to 00:00:29, or any other range. The ranges may be predetermined and/or may be customized by a user and/or an administrator. Alternatively, the frequency distribution presentation times 802 may be broken into any duration of intervals (e.g., thirty second intervals, 2 minute intervals, 5 minute intervals, etc.).

To generate and/or update the example model of FIG. 8A, the example collection facility 114 of FIG. 1 collects metering data from the example LPM 106. Once the example data adjuster 120 breaks the metering data into tuning sessions and presentation sessions, the example data adjuster 120 populates the model(s) based on the tuning session data and presentation session data. The example frequency distribution of FIG. 8A is populated based on presentation session data from tuning sessions of 10 minute length. Each of the 5,963 collected 10-minute tuning sessions are represented in a presentation duration bucket based on the total presentation time of the tuning session (e.g., the amount time within the 10-minute tuning session 800 that media was presented). The example of FIG. 8A includes 112 instances of a total presentation time of 0 minutes labeled 804 for a 10-minute tuning session 800, 242 instances of a total presentation time of 1 minute labeled 808 for a 10-minute tuning session 800, etc. As additional metering data is processed by the example data adjuster 120, the example model is updated to represent the additional monitored data.

Various statistical calculations (e.g., weighted average, standard deviation, etc.) can additionally be determined by the example modeler 208 based on the data from the frequency distribution of FIG. 8A. For example, an expected value (e.g., weighted average) may be calculated using the following formula:

$$\bar{x} = \frac{\sum_{i=1}^{n} w_i \cdot x_i}{\sum_{i=1}^{n} w_i}$$

Where $\bar{x}$ is the expected value, $w_i$ is the number of instances in presentation bucket i, and $x_i$ is the number of presentation minutes of presentation bucket i.

The example model of FIG. 8A has an expected value of 6.58, as shown below:

$$\frac{0(112) + 1(242) + 2(338) + 3(370) + 4(390) + 5(490) + 6(491) + 7(781) + 8(901) + 9(903) + 10(945)}{5963} = 6.58$$

The example expected value is the number of expected total presentation minutes given a 10-minute tuning session. In other words, given a received 10-minute tuning session from a media presentation device, it is expected that a total of 6.58 minutes of the 10 minutes were actually presented to a user. The expected value for each tuning session length can be plotted on a graph, as further described in FIG. 9.

FIG. 8B displays an example model of an example conditional distribution of presentation time based on the example frequency distribution of FIG. 8A. Additionally other models may be created for conditional distribution of presentation time for tuning sessions of varying lengths (e.g., 1-minute session, 5-minute tuning session, 60-minute tuning session, 720-minute tuning session, etc.) Alternatively, one model may be generated with multiple rows representing varying tuning session lengths.

The example model of FIG. 8B includes an example conditional distribution of presentation times 812 broken into one minute intervals for an example 10-minute tuning session 800. In some examples, the presentation times 812 represent a range of times. For example, the example presentation time '0' labeled 814 may include all time from 00:00:00 to 00:00:59, 00:00:00 to 00:00:29, or any other range. The ranges may be predetermined or may be customized by an administrator. Alternatively, the conditional distribution 812 may be broken into any duration of intervals (e.g., thirty second intervals, 2 minute intervals, 5 minute intervals, etc.).

Conditional distribution buckets contain conditional percentages based on the frequency distributions of FIG. 8A. The conditional percentages in the example conditional distribution buckets are calculated by dividing each frequency distribution bucket by a total number of tuning sessions modeled for a tuning session length. For example, the conditional distribution percentage for a 0-minute presentation session 814 within a 10-minute tuning session 800 is calculating by dividing the 112 instances of the 0-minute presentation session labeled 806 by the total number of 10-minute tuning sessions 800 (e.g., 112+242+338+370+ 390+490+491+781+901+903+945=5963 total sessions) as shown below:

$$\frac{112}{5963} = 2\%$$

2% is placed in the conditional distribution bucket for the 0-minute presentation session 816 within a 10 minute tuning session 800. Other example conditional distribution buckets are calculated in a similar manner. For example, FIG. 8B illustrates that 4% of the 10-minute tuning sessions contain a total presentation time of 1 minute, 8% of the 10-minute tuning sessions contain a total presentation time of 5 minutes, 16% of the 10-minute tuning sessions contain a total presentation time of 10 minutes, etc.

FIG. 8C is an example model of an example cumulative distribution of presentation time based on the example conditional distribution of FIG. 8B. Additionally other models may be created for conditional distribution of presentation time for tuning sessions of varying lengths (e.g., 1-minute session, 5-minute tuning session, 60-minute tuning session, 720-minute tuning session, etc.) Alternatively, one model may be generated with multiple rows representing varying tuning session lengths.

The example model of FIG. 8C includes an example cumulative distribution of presentation times 824 broken into one minute intervals for an example 10-minute tuning session 800. In some examples, the presentation times 824 represent a range of times. For example, the example presentation time '0' labeled 826 may include all time from 00:00:00 to 00:00:59, 00:00:00 to 00:00:29, or any other range. The ranges may be predetermined or may be customized by an administrator. Alternatively, the example cumulative distribution 824 may be broken into any duration of intervals (e.g., thirty second intervals, 2 minute intervals, 5 minute intervals, etc.).

Cumulative distribution buckets contain cumulative percentages based on the conditional distribution of FIG. 8B. The cumulative percentages in the example cumulative distribution buckets are calculated by adding the percentage in a selected conditional distribution bucket with the percentages in all the conditional distribution buckets prior to the selected conditional distribution bucket. For example, the cumulative distribution bucket for a 3-minute presentation session within a 10-minute tuning session 800 is calculated by adding the percentage in the 3 minute conditional distribution bucket 822 for a 10-minute tuning session 800 (e.g., 6%) with the percentage in the 2-minute (e.g., 6%) conditional distribution bucket 720, 1-minute (e.g., 4%) conditional distribution bucket 818, and 0-minute (e.g., 2%) conditional distribution bucket 816 and for a 10-minute tuning session 800 as shown below:

6%+6%+4%+2%=18%

18% is placed in the 3-minute cumulative distribution bucket 828 and the other example cumulative distribution buckets are calculated in a similar manner. The percentages in each cumulative distribution buckets represent the total percentage of presentation times of up to a particular length of time. For example, 54% of the 10-minute tuning sessions contained a total presentation sessions of 8 minutes or less. Alternatively, a cumulative distribution may be calculated based on the frequency distribution of FIG. 8A. In this manner, the cumulative distribution calculated using the frequency distribution of FIG. 8A as appose to the conditional distribution percentages of FIG. 8B. The distributions models of FIGS. 8A, 8B, and 8C may be used to adjust tuning data from a STB in order to determine a total presentation session for the tuning data from the STB, as further described in FIG. 9.

FIG. 8D displays an example model of an example frequency distribution of media output device presented at set times 830 during a 10-minute tuning session 800. Additionally, other models may be created for tuning sessions of varying lengths (e.g., 1-minute tuning session, 5-minute tuning session, 60-minute tuning session, 720-minute tuning session, etc.). Alternatively, one model may be generated with multiple rows representing the varying tuning session lengths.

The example model of FIG. 8D includes an example frequency distribution of media output devices presented at set times 830 broken into one minute intervals for an example 10-minute tuning session 800. Alternatively, the frequency distribution 830 may be broken into any duration of intervals (e.g., thirty second intervals, 2 minute intervals, 5 minute intervals, etc.). If a user of the media presentation device was presentation the media presentation device at the designated time, the instance is counted in a corresponding frequency distribution bucket. In some examples, the blocks can represent a range of times. For example, the blocks may be broken up so that if a user was exposed to media by the media presentation device 108 within the 00:00:00-00:00:29 window, the instance would be counted in the 'at 0' frequency distribution bucket 832.

To generate and/or update the example model of FIG. 8D, the example collection facility 114 of FIG. 1 collects metering data from the example LPM 106. Once the example data adjuster 120 breaks the metering data into tuning sessions and presentation sessions, the example data adjuster 120 populates the model(s) based on tuning session data and presentation session data. The example model of the example frequency distribution of media output devices presenting at set times of FIG. 8D is populated based on presentation session data from tuning sessions of 10 minute length. Each of the 5963 gathered 10-minute tuning sessions are analyzed to determine how many media presentation device 108 were actually presenting media on media output device 104 at set times of the 10-minute tuning session. For example, a 10-minute tuning session containing presentation sessions from 00:00-05:30 and from 08:45-10:00 would be entered as being watched in the at 0, at 1, at 2, at 3, at 4, at 5, at 9, and at 10 minute frequency distribution blocks.

FIG. 8E displays an example model of an example conditional distribution of media output devices presenting media at set times 836 during a 10-minute tuning session 800. Additionally, other models may be created for tuning sessions of varying lengths (e.g., 1-minute tuning session, 5-minute tuning session, 60-minute tuning session, 720-minute tuning session, etc.). Alternatively, one model may be generated with multiple rows representing rows representing the varying tuning session lengths.

The example model of FIG. 8E includes an example conditional distribution of media output devices presenting media at set times 836 broken into one minute intervals for an example 10-minute tuning session 800. Alternatively, the conditional distribution at set times 836 may be broken into any duration of intervals (e.g., thirty second intervals, 2 minute intervals, 5 minute intervals, etc.). If a user of the media presentation device was presentation the media presentation device at the designated time, the instance is counted in a corresponding conditional distribution bucket. In some examples, the blocks can represent a range of times. For example, the blocks may be broken up so that if a user was exposed to media by the media presentation device 108 within the 00:00:00-00:00:29 window, the instance would be counted in the 'at 0' conditional distribution bucket labeled 838.

Conditional distribution buckets contain conditional percentages based on the frequency distributions 830 of FIG. 8D. The conditional percentages in the example conditional distribution buckets are calculated based on dividing each frequency distribution bucket by a total number of tuning sessions modeled for a tuning session length. For example, the conditional distribution percentage at the fifth minute for the example 10 minute-tuning session 800 is calculating by dividing the 4411 presentation instances at the fifth minute 834 by the total number of 10-minute tuning sessions (e.g., 5963 total sessions) as shown below:

$$\frac{4411}{5963} = 74\%$$

74% is placed in the at 5 minute conditional bucket 840 for a 10 minute tuning session. Other example conditional distribution buckets 820 are calculated in a similar manner. The conditional distribution of FIG. 8B illustrates that 100% of the total 10-minute tuning sessions were presenting media at the zeroth minute, 88% of the total 10-minute tuning sessions were presenting media at the third minute, 49% of the total 10-minute tuning sessions were presenting media at the tenth minute, etc. Additionally, a report may be generated including any of the example models or combination of the example models. The distributions models of FIGS. 8D and 8E may be used to adjust tuning data from a STB based on an initial presentation session, an ending presentation session, and/or any other presentation session information for the tuning data of the STB, as previously described in FIG. 4.

FIG. 9 is an example graph of expected total presentation session values based on various tuning sessions generated from metering data of the LPM 106 of FIG. 1. The example data adjuster 120 determines an expected total presentation session by calculating a weighted average of the total presentation sessions of a selected tuning session length. For example, as previously described in FIG. 5A, the example expected value for the 10-minute tuning session of FIG. 5A was 6.58. Therefore, the example graph of FIG. 9 will have a coordinate (e.g., (10, 6.58)) to represent the expected value for the 10-minute tuning session. The example graph contains a point for every tracked tuning session (e.g., a 1 minute tuning session, 10 minute tuning session, 200 minute tuning session, etc.). A report may be generated including the example graph.

Figure 10:
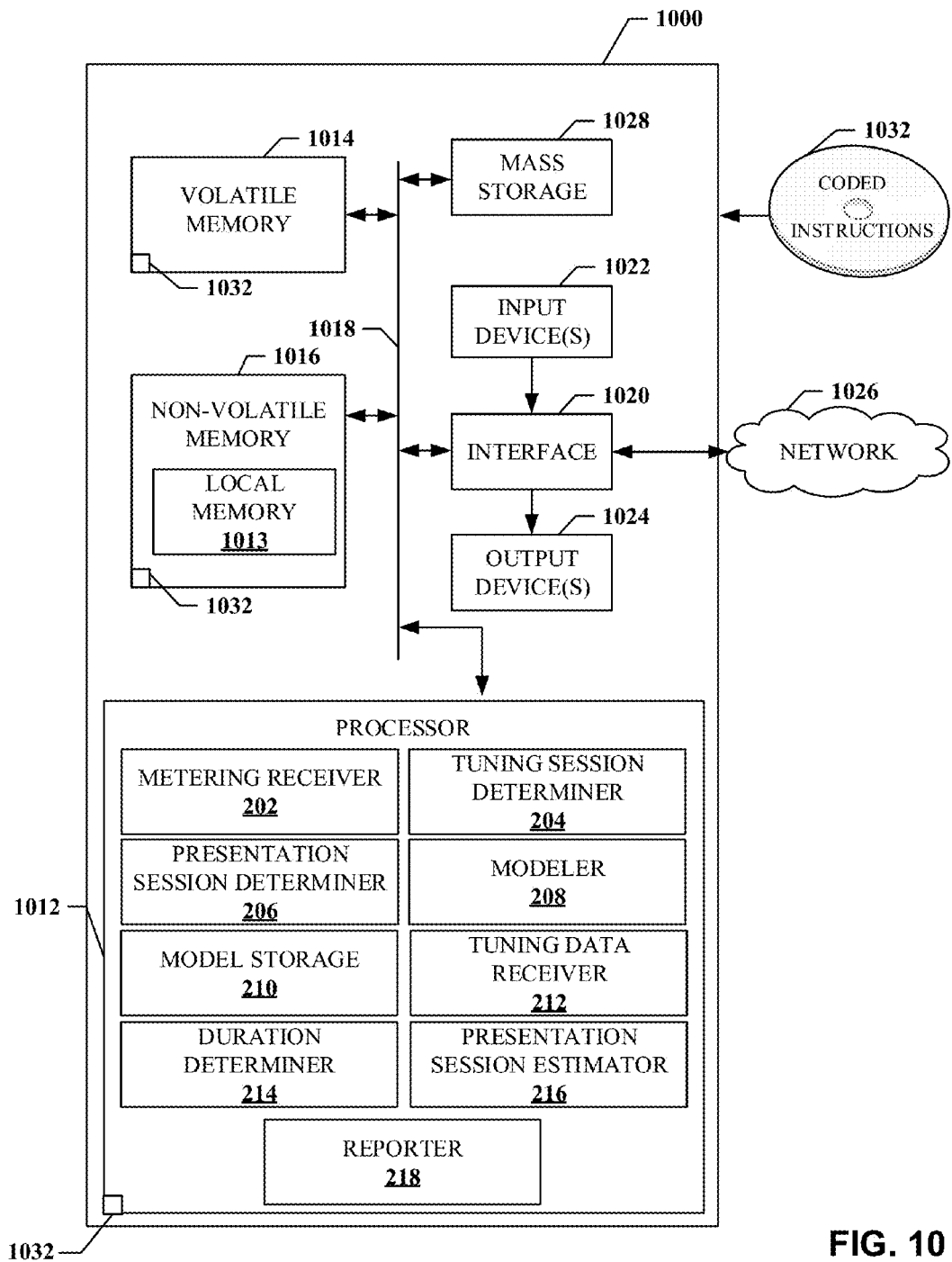
FIG. 10 is a block diagram of an example processing system capable of executing the example machine readable instructions of FIGS. 3-5 to implement the example data adjuster of FIGS. 1 and/or 2.

FIG. 10 is a block diagram of an example processor platform 1000 capable of executing the instructions of FIGS. 3-5 to implement the example data adjuster 120 of FIG. 1. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by integrated circuits, logic circuits, microprocessors or controllers from any desired family or manufacturer.

The processor 1012 of the illustrated example includes a local memory 1013 (e.g., a cache). The example processor 1012 of FIG. 10 executes the instructions of FIGS. 3-5 to the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218 of FIG. 2 to implement the example data adjuster 120. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1012. The interface circuit 1012 may be implemented by any type of interface standard, such as an Ethernet interface, a universal serial bus (USB), and/or a PCI express interface.

In the illustrated example, one or more input devices 1022 are connected to the interface circuit 1012. The input device(s) 1022 permit(s) a user to enter data and commands into the processor 1012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1024 are also connected to the interface circuit 1012 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1012 of the illustrated example, thus, typically includes a graphics driver card, a graphics driver circuit or a graphics driver processor.

The interface circuit 1012 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 3-5 may be stored in the mass storage device 1028, in the volatile memory 1014, in the non-volatile memory 1016, and/or on a removable tangible computer readable storage medium such as a CD or DVD.

From the foregoing, it should be appreciated that the above disclosed methods, apparatus, and articles of manufacture estimate presentation session from tuning data based on metering data. Media presentation device data may have extraneous information leading to inaccurate audience measurement data. For example, STB data does not account for when a television is off and the television is on, or when the television is on, but no one is watching the media presentation device. Methods and apparatus described herein estimate presentation sessions for tuning data to account for the extraneous information. Since LPMs can determine more accurate information including when a media presentation device is on and when a user is actually watching the media presentation device, metering data from the LPM are analyzed to create models used to accurately adjust media presentation device data.

Using the examples disclosed herein, media presentation device data may be more accurately analyzed based on data from a plurality of LPMs. In some examples, models are created from metering data of LPMs initial presentation session, a final presentation session, and a total presentation session within a tuning session. In such examples, presentation sessions for tuning data from media monitoring devices may be estimated based on data in corresponding models. In this manner, reports may be generated to include the estimated presentation session for a tuning session of a media presentation device.

From the foregoing, persons of ordinary skill in the art will appreciate that the above disclosed methods and apparatus may be realized within a single device or across two cooperating devices, and could be implemented by software, hardware, and/or firmware to implement the data adjuster disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for determining media presentation sessions based on tuning session data, the method comprising:
obtaining, by executing an instruction with a processor, a first tuning session duration indicative of an amount of time between channel changes of a first media presentation device at a first media presentation location;
obtaining by executing an instruction with the processor, a first presentation session duration of media presented within the first tuning session duration;
storing, by executing an instruction with the processor, a relation between the first tuning session duration and the first presentation session duration in a model corresponding to the first tuning session duration;
obtaining, by executing an instruction with the processor, a second tuning session duration indicative of an amount of time between channel changes of a second media presentation device at a second media presentation location;
selecting the model from storage based on a match of the first tuning session duration and the second tuning session duration;
estimating a second presentation session duration of media presented within the second tuning session duration based on the model; and
presenting, by executing an instruction with the processor, a report including the second presentation session duration.

2. The method of claim 1, wherein the first tuning session duration and the first presentation session duration are received from a metering device.

3. The method of claim 1, wherein the model is determined based on the first tuning session duration.

4. The method of claim 1, wherein the first presentation session duration includes data related to when the first media presentation device is powered on.

5. The method of claim 1, wherein the first presentation session duration includes data related to when a user is present at a location of the first media presentation device.

6. The method of claim 1, wherein estimating the second presentation session duration for the tuning data is based on the first presentation session duration, the second presentation session duration including at least one of a first presentation session within the tuning data, a last presentation session within the tuning data, or a total presentation session within the tuning data.

7. The method of claim 1, wherein the model includes at least one of a conditional probability, an expected value, a frequency distribution, or a cumulative distribution based on the first presentation session duration.

8. The method of claim 1, further including combining data in the model based on tuning session durations that are within a threshold range.

9. The method of claim 1, wherein the second media presentation device is a set top box.

10. An apparatus to determine media presentation sessions based on tuning session data, the apparatus comprising:
    a tuning session determiner to obtain a first tuning session duration indicative of an amount of time between channel changes of a first media presentation device at a first media presentation location;
    a presentation session determiner to obtain a first presentation session duration of media presented within the first tuning session duration;
    a modeler to store a relation between the first tuning session duration and the first presentation session duration in a model corresponding to the first tuning session duration;
    a receiver to obtain a second tuning session duration indicative of an amount of time between channel changes of a second media presentation device at a second media presentation location; and
    a presentation session estimator to:
        select the model from storage based on a match of the first tuning session duration and the second tuning session duration, and
        estimate a second presentation session duration of media presented within the second tuning session duration based on the model; and
    a reporter to present a report including the second presentation session duration, at least one of the tuning session determiner, the presentation session determiner, the modeler, the receiver, the presentation session estimator, or the reporter including hardware.

11. The apparatus of claim 10, wherein the first tuning session duration and the first presentation session duration are received from a metering device.

12. The apparatus of claim 10, wherein the modeler is to determine model is based on the first tuning session duration.

13. The apparatus of claim 10, wherein the first presentation session duration includes data related to when the first media presentation device is powered on.

14. The apparatus of claim 10, wherein the first presentation session duration includes data related to when a user is present at a location of the first media presentation device.

15. The apparatus of claim 10, wherein the presentation session estimator is to estimate the second presentation session duration for the tuning data based on the first presentation session duration, the second presentation session duration including at least one of a first presentation session within the tuning data, a last presentation session within the tuning data, or a total presentation session within the tuning data.

16. The apparatus of claim 10, wherein the model includes at least one of a conditional probability, an expected value, a frequency distribution, or a cumulative distribution based on the first presentation session duration.

17. The apparatus of claim 10, wherein the modeler is to combine data in the model based on tuning session durations that are within a threshold range.

18. The apparatus of claim 10, wherein the second media presentation device is a set top box.

19. A non-transitory computer readable medium comprising instructions that, when executed, cause a machine to:
    obtain a first tuning session duration indicative of an amount of time between channel changes of a first media presentation device at a first media presentation location;
    obtain a first presentation session duration of media presented within the first tuning session duration;
    store a relation between the first tuning session duration and the first presentation session duration in a model corresponding to the first tuning session duration;
    obtain a second tuning session duration indicative of an amount of time between channel changes of a second media presentation device at a second media presentation location;
    select the model from storage based on a match of the first tuning session duration and the second tuning session duration;
    estimate a second presentation session duration of media presented within the second tuning session duration based on the model; and
    present a report including the second presentation session duration.

20. The non-transitory computer readable medium of claim 19, wherein the first tuning session duration and the first presentation session duration are received from a metering device.

21. The method of claim 1, wherein the channel change is a change in media presentations at the first or the second media presentation device by a media streaming service.

* * * * *